United States Patent
Jia et al.

(10) Patent No.: US 11,564,255 B2
(45) Date of Patent: Jan. 24, 2023

(54) METHOD AND APPARATUS FOR PROCESSING LBT MONITORING FAILURES AND SYSTEM

(71) Applicant: FUJITSU LIMITED, Kawasaki (JP)

(72) Inventors: Meiyi Jia, Beijing (CN); Qinyan Jiang, Beijing (CN); Lei Zhang, Beijing (CN); Guoyu Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/206,598

(22) Filed: Mar. 19, 2021

(65) Prior Publication Data
US 2021/0212112 A1    Jul. 8, 2021

Related U.S. Application Data

(63) Continuation of application No. PCT/CN2018/107781, filed on Sep. 26, 2018.

(51) Int. Cl.
*H04W 74/00* (2009.01)
*H04W 76/27* (2018.01)
(Continued)

(52) U.S. Cl.
CPC ........ *H04W 74/008* (2013.01); *H04B 7/0626* (2013.01); *H04L 5/0051* (2013.01);
(Continued)

(58) Field of Classification Search
CPC ... H04W 74/008; H04W 76/27; H04W 24/08; H04L 5/0051
See application file for complete search history.

(56) References Cited

U.S. PATENT DOCUMENTS

2017/0006640 A1*  1/2017  Dinan ............... H04W 74/0833
2017/0006641 A1*  1/2017  Dinan ............... H04W 74/0833
(Continued)

FOREIGN PATENT DOCUMENTS

CN    107734682 A    2/2018
CN    108476532 A    8/2018
(Continued)

OTHER PUBLICATIONS

International Search Report and Written Opinion of the International Searching Authority by the State Intellectual Property Office of the P.R. China for corresponding International Patent Application No. PCT/CN2018/107781, dated Jun. 25, 2019, with an English translation.
(Continued)

*Primary Examiner* — Fahmida S Chowdhury
(74) *Attorney, Agent, or Firm* — Myers Wolin, LLC

(57) ABSTRACT

A method for processing LBT monitoring failures, a method for transmitting preambles, apparatuses thereof and a system. The method for processing LBT monitoring failures includes: a physical layer of a terminal equipment performs LBT monitoring, and indicates an LBT monitoring failure or random access preamble transmission drop or an LBT detection instance failure to an MAC layer or an RRC layer when the physical layer deems that the LBT monitoring fails; and the MAC layer or RRC layer of the terminal equipment performs at least one piece of the following processing according to the indication: performing resource selection; triggering channel selection or BWP switching; triggering a radio link failure; triggering RRC connection reestablishment; and performing counter maintenance.

12 Claims, 5 Drawing Sheets

401 a physical layer of the terminal equipment performs LBT monitoring, and indicates an LBT monitoring failure or random access preamble transmission drop or an LBT detection instance failure to an MAC layer or an RRC layer when it deems that the LBT monitoring fails

402 the MAC layer or the RRC layer of the terminal equipment performs at least one piece of the following processing according to the indication: performing resource selection; triggering channel selection or BWP switching; triggering a radio link failure; triggering RRC connection reestablishment; and performing counter maintenance

(51) Int. Cl.
| | |
|---|---|
| *H04B 7/06* | (2006.01) |
| *H04L 5/00* | (2006.01) |
| *H04W 24/08* | (2009.01) |
| *H04W 56/00* | (2009.01) |
| *H04W 74/08* | (2009.01) |
| *H04W 80/02* | (2009.01) |

(52) U.S. Cl.
 CPC ......... *H04W 24/08* (2013.01); *H04W 56/001* (2013.01); *H04W 74/0816* (2013.01); *H04W 76/27* (2018.02); *H04W 80/02* (2013.01)

(56) References Cited

U.S. PATENT DOCUMENTS

| | | | | |
|---|---|---|---|---|
| 2017/0318595 | A1* | 11/2017 | Dinan | H04L 5/0053 |
| 2017/0353972 | A1* | 12/2017 | Babaei | H04W 72/02 |
| 2018/0124612 | A1* | 5/2018 | Babaei | H04W 74/0833 |
| 2018/0124831 | A1* | 5/2018 | Dinan | H04W 72/0413 |
| 2018/0184362 | A1* | 6/2018 | Babaei | H04W 76/18 |
| 2018/0288623 | A1* | 10/2018 | Hampel | H04W 16/14 |
| 2018/0368205 | A1* | 12/2018 | Park | H04W 16/28 |
| 2021/0029748 | A1* | 1/2021 | Dinan | H04W 74/0833 |
| 2021/0307061 | A1* | 9/2021 | Huang | H04W 74/006 |

FOREIGN PATENT DOCUMENTS

| | | |
|---|---|---|
| EP | 3 500 011 A1 | 6/2019 |
| WO | 2017/136458 A2 | 8/2017 |
| WO | 2017/181124 A1 | 10/2017 |

OTHER PUBLICATIONS

Intel Corporation, "Enhancements to initial access and mobility for NR-unlicensed", Agenda Item: 7.2.2.4.2, 3GPP TSG-RAN WG1 Meeting #94, R1-1808686, Gothenburg, Sweden, Aug. 20-24, 2018.
ZTE, "Discussion on initial access and mobility for NR-U", Agenda Item: 7.2.2.4.2, 3GPP TSG-RAN WG1 Meeting #94, R1-1808322, Gothenburg, Sweden, Aug. 20-24, 2018.
Examination Report issued by the Patent Office of India for corresponding Indian Patent Application No. 202137010423, dated Feb. 8, 2022, with an English translation.
Extended European search report with the supplementary European search report and the European search opinion issued by the European Patent Office for corresponding European Patent Application No. 18935200.8-1215, dated Oct. 12, 2021.
Notice of Reasons for Refusal issued by the Japan Patent Office for corresponding Japanese Patent Application No. 2021-516390, dated May 17, 2022, with an English translation.
Notice of Preliminary Rejection issued by the Korean Intellectual Property Office for corresponding Korean Patent Application No. 10-2021-7008261, dated Aug. 31, 2022, with an English translation.

* cited by examiner

METHOD AND APPARATUS FOR PROCESSING LBT MONITORING FAILURES AND SYSTEM

CROSS-REFERENCE TO RELATED APPLICATION

This application is a continuation application of International Application PCT/CN2018/107781 filed on Sep. 26, 2018 and designated the U.S., the entire contents of which are incorporated herein by reference.

FIELD

This disclosure relates to the field of communication technologies, and in particular to a method and an apparatus for processing LBT monitoring failures and a system.

BACKGROUND

Radio link failure (RLF) is a hot topic in communication standardization research.

In New Radio (NR), detection of a radio link failure will be triggered when the following conditions are met that: a timer T 310 expires, a random access procedure fails and the timer T 311 is not running, and radio link control (RLC) fails. Reference may be made to existing standards for definitions of timers T 310 and T 311.

FIG. 1 is a schematic diagram of a random access procedure. As shown in FIG. 1, when the terminal equipment does not receive a random access response or contention resolution is unsuccessful, a counter "PREAMBLE_TRANSMISSION_COUNTER" is added by 1. When a value of the counter is "preambleTransMax+1", the terminal equipment indicates "a random access problem" to an upper layer.

In a case where a radio link failure occurs, if the terminal equipment is not configured with dual connectivity (DC), or the terminal equipment is configured with DC and the radio link failure occurs in a master cell group (MCG), the terminal equipment deems that it is a radio link failure of the master cell group, in which case the terminal equipment may stay in a connected state, select a suitable cell and perform connection reestablishment. If no suitable cell is found within a certain period of time after the radio link failure, the terminal equipment may enter into an idle state. If the terminal equipment is configured with DC and the radio link failure occurs in a secondary cell group (SCG), the terminal equipment deems that it is a radio link failure of the secondary cell group, in which case the terminal equipment may report the failure to a network device via a secondary cell group failure information process.

On the other hand, a problem of frequency resources has always been one of the important topics in the discussion of communication technologies. In order to solve the problem of frequency resources, in addition to improving resource utilization, the Third Generation Partnership Project (3GPP) also tried to use more frequency bands, including unlicensed bands. In order to provide 3GPP services on unlicensed bands, the following mechanisms are introduced: Listen Before Talk (LBT), and Discovery RS Measurement Timing Configuration (DMTC).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that when an unlicensed band is used to provide services for a terminal equipment, as channel monitoring is needed before communication between a network device and the terminal equipment, so as to determine whether a channel is idle. Only when the channel is idle, the terminal equipment may transmit uplink messages and uplink data, etc., which will affect behaviors of the terminal equipment. In addition, in the random access procedure of the unlicensed band, after a medium access control (MAC) sublayer instructs a lower layer (physical layer) to transmit a random access preamble, due to an LBT failure, the physical layer is made to drop a current time of the preamble transmission. After the preamble transmission is dropped, behaviors of the terminal equipment are unclear. This may affect a success rate of random access and services of the terminal equipment in a connected state.

In order to solve at least one of the above problems or other similar problems, embodiments of this disclosure provide a method for processing LBT monitoring failures, a method for transmitting preambles, apparatuses thereof and a system.

According to a first aspect of the embodiments of this disclosure, there is provided a method for transmitting random access preambles, wherein the method includes:

determining, by a media access control (MAC) layer of a terminal equipment, a first number of random access transmission opportunities (ROs) used for transmitting preambles or selecting downlink reference signals corresponding to ROs used for transmitting preambles; and determining, by a physical layer of the terminal equipment, a second number of ROs according to the first number of ROs or the downlink reference signals, both the first number and the second number being greater than 1.

According to a second aspect of the embodiments of this disclosure, there is provided a method for processing LBT monitoring failures, wherein the method includes:

performing LBT monitoring by a physical layer of a terminal equipment, and indicating an LBT monitoring failure or random access preamble transmission drop or an LBT detection instance failure to an MAC layer or an RRC layer when the physical layer deems that the LBT monitoring fails; and performing at least one piece of the following processing by the MAC layer or the RRC layer of the terminal equipment according to the indication:

performing resource selection;
triggering channel selection or BWP switching;
triggering a radio link failure;
triggering RRC connection reestablishment; and
performing counter maintenance.

According to a third aspect of the embodiments of this disclosure, there is provided an apparatus for transmitting random access preambles, configured in a terminal equipment, the apparatus including:

a first determining unit configured to, on a media access control (MAC) layer of the terminal equipment, determine a first number of random access transmission opportunities (ROs) used for transmitting preambles or select downlink reference signals corresponding to ROs used for transmitting preambles; and a second determining unit configured to, on a physical layer of the terminal equipment, determine a second number of ROs according to the first number of ROs or the downlink reference signals, both the first number and the second number being greater than 1.

According to a fourth aspect of the embodiments of this disclosure, there is provided an apparatus for processing LBT monitoring failures, configured in a terminal equipment, the apparatus including:

a monitoring unit configured to perform LBT monitoring on a physical layer of the terminal equipment, and indicate an LBT monitoring failure or random access preamble transmission drop or an LBT detection instance failure to an MAC layer or an RRC layer when it deems that the LBT monitoring fails; and a processing unit configured to perform at least one piece of the following processing on the MAC layer or the RRC layer of the terminal equipment according to the indication:

performing resource selection;
triggering channel selection or BWP switching;
triggering a radio link failure;
triggering RRC connection reestablishment; and
performing counter maintenance.

According to a fifth aspect of the embodiments of this disclosure, there is provided a configuration method, wherein the method includes:

configuring multiple initial BWPs by a network device for a terminal equipment in an idle state or an active state, and determining an RO on each of the initial BWPs by the terminal equipment.

According to a sixth aspect of the embodiments of this disclosure, there is provided a configuration apparatus, configured in a network device, the apparatus including:

a configuring unit configured to configure multiple initial BWPs for a terminal equipment in an idle state or an active state, an RO on each of the initial BWPs being determined by the terminal equipment.

According to a seventh aspect of the embodiments of this disclosure, there is provided a terminal equipment, including the apparatus as described in the third or fourth aspect.

According to an eighth aspect of the embodiments of this disclosure, there is provided a network device, including the apparatus as described in the sixth aspect.

According to a ninth aspect of the embodiments of this disclosure, there is provided a communication system, including the terminal equipment as described in the seventh aspect and the network device as described in the eighth aspect.

According to another aspect of the embodiments of this disclosure, there is provided a computer readable program, wherein when the program is executed in a terminal equipment, the program causes a computer to carry out the method as described in the first aspect or the third aspect in the terminal equipment.

According to a further aspect of the embodiments of this disclosure, there is provided a storage medium storing a computer readable program, wherein the computer readable program causes a computer to carry out the method as described in the first aspect or the third aspect in a terminal equipment.

According to yet another aspect of the embodiments of this disclosure, there is provided a computer readable program, wherein when the program is executed in a network device, the program causes a computer to carry out the method as described in the fifth aspect in the network device.

According to still another aspect of the embodiments of this disclosure, there is provided a storage medium storing a computer readable program, wherein the computer readable program causes a computer to carry out the method as described in the fifth aspect in a network device.

An advantage of the embodiments of this disclosure exists in that with the method for processing LBT monitoring failures of the embodiment, a response time after the LBT monitoring failure is shortened, and a success rate of random access is improved. With the method for transmitting random access preambles of the embodiment, the MAC layer of the terminal equipment determines multiple transmission opportunities for transmitting preambles or selects a downlink reference signal related to the transmission related to transmitting the preambles to make the physical layer of the terminal equipment obtain multiple transmission opportunities, thereby increasing transmission opportunities of random access and ensuring the reliability of the random access.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
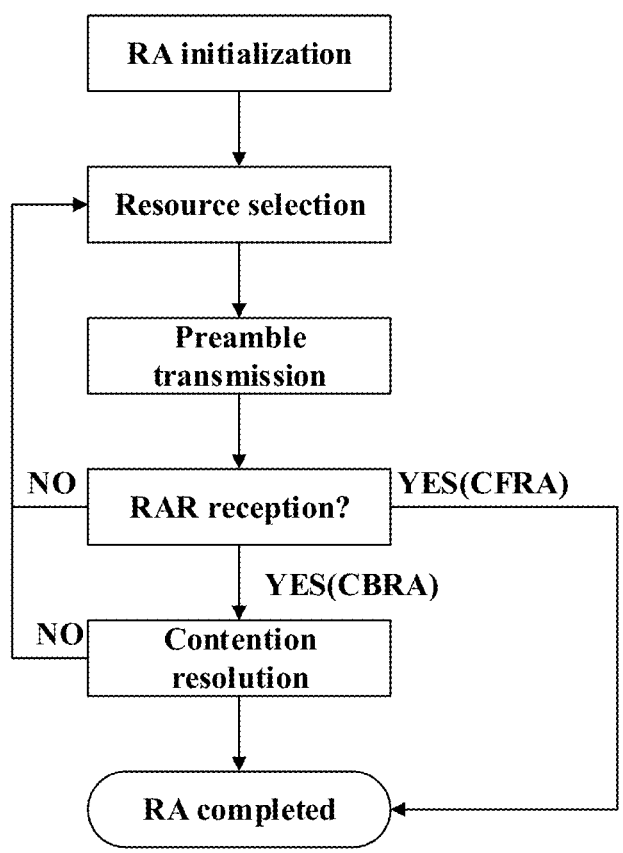
FIG. 1 is a schematic diagram of an existing random access procedure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" refers to, for example, equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

Figure 2:
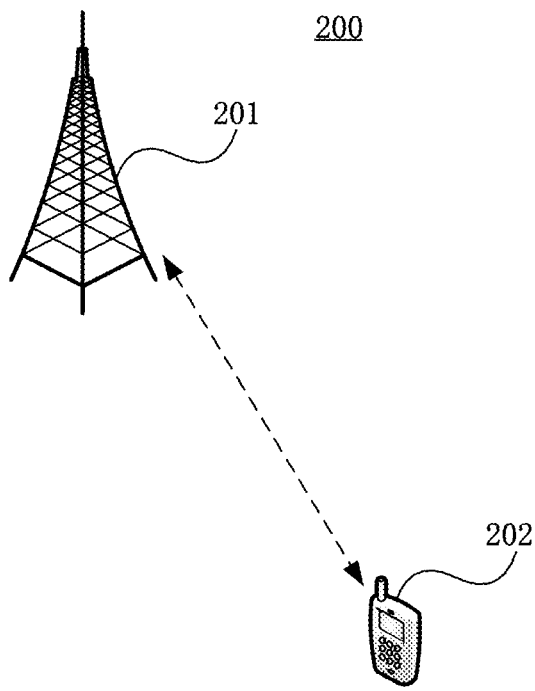
FIG. 2 is a schematic diagram of a communication system of an embodiment of this disclosure.

FIG. 2 is a schematic diagram of a communication system of an embodiment of this disclosure, in which a case where a terminal equipment and a network device are taken as examples is schematically shown. As shown in FIG. 2, a communication system 200 may include a network device 201 and a terminal equipment 202. For the sake of simplicity, an example having one terminal equipment only is schematically given in FIG. 2. The network device 201 is, for example, a network device gNB in an NR system.

In the embodiment of this disclosure, existing traffics or traffics that may be implemented in the future may be performed between the network device 201 and the terminal equipment 202. For example, such traffics may include but not limited to enhanced mobile broadband (eMBB), massive machine type communication (MTC), and ultra-reliable and low-latency communication (URLLC), etc.

The terminal equipment 202 may transmit data to the network device 201, such as in a grant-free transmission mode. The network device 201 may receive data transmitted by one or more terminal equipments 202, and feed back information (such as ACK/NACK information) to the terminal equipment 202, and the terminal equipment 202 may acknowledge to end a transmission process according to the feedback information, or may further perform new data transmission, or may perform data retransmission.

Various embodiments of this disclosure shall be described below with reference to the accompanying drawings. These embodiments are illustrative only, and are not intended to limit this disclosure.

Embodiment 1

Figure 3:
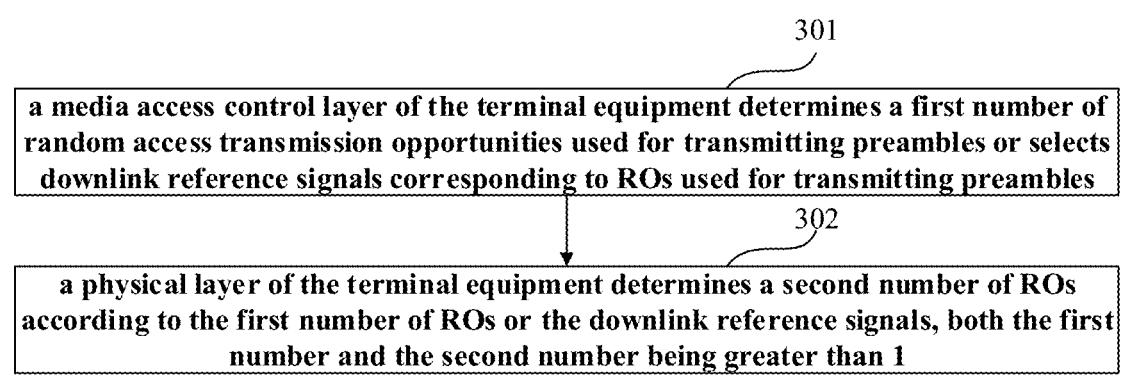
FIG. 3 is a schematic diagram of the method for transmitting random access preambles of Embodiment 1.

This embodiment provides a method for transmitting random access preambles, applicable to a terminal equipment. FIG. 3 is a schematic diagram of the method for transmitting random access preambles of this embodiment. Referring to FIG. 3, the method includes:

step 301: a media access control (MAC) layer of the terminal equipment determines a first number of random access transmission opportunities (ROs) used for transmitting preambles or selects downlink reference signals corresponding to ROs used for transmitting preambles; and step 302: a physical layer of the terminal equipment determines a second number of ROs according to the first number of ROs or the downlink reference signals, both the first number and the second number being greater than 1.

In one implementation of this embodiment, the MAC layer of the terminal equipment may determine multiple transmission opportunities, hence the physical layer of the terminal equipment may obtain the multiple transmission opportunities, and transmit preambles on at least one of the multiple transmission opportunities. As the number of the transmission opportunities are increased, the terminal equipment may perform multi-LBT monitoring, which increases opportunities for transmitting preambles. In this implementation, both the first number and the second number are greater than 1, and the first number and the second number may be identical or different.

In this embodiment, LBT monitoring is taken as an example for description. The LBT monitoring mechanism may also be replaced with other mechanisms for channel busy/idle assessment, such as clear channel assessment (CCA), etc. This embodiment is not limited thereto.

In another implementation of this embodiment, the MAC layer of the terminal equipment does not determine the above transmission opportunities, but indicates the selected downlink reference signal. The downlink reference signal is related to the foregoing transmission opportunities, and according to the downlink reference signal selected by the MAC layer, the physical layer of the terminal equipment may obtain multiple transmission opportunities related to the downlink reference signal, and then transmit the preambles at the multiple transmission opportunities, and the terminal equipment may perform multi-LBT monitoring, which increases opportunities for transmitting preambles. In this embodiment, the above second number is greater than 1.

In this embodiment, the physical layer of the terminal equipment may determine the second number of ROs according to the first number of ROs or the above downlink reference signal, and may further determine the second number of ROs with reference to other rules or criteria; however, this embodiment is not limited thereto.

In this embodiment, the aforementioned downlink reference signal may be a synchronization signal/broadcast channel block (SSB), or a channel state information reference signal (CSI-RS), or a combination thereof. However, this embodiment is not limited thereto, and the downlink reference signal may also have other names, or may borrow a name in current standards and add the above functions applicable to the method in this embodiment.

In step 301 of this embodiment, the physical layer of the terminal equipment may determine the above first number of ROs in the following methods:

Method 1:
The MAC layer of the terminal equipment selects a third number of SSBs and/or CSI-RSs, and determines an RO corresponding to each selected SSB and/or CSI-RS to obtain the first number of ROs.

In this method, the MAC layer may select multiple SSBs and/or CSI-RSs, and determine an RO corresponding to each selected SSB and/or CSI-RS to obtain multiple ROs. As an RO of an SSB may possibly overlap with an RO of a CSI-RS, the third number is greater than the first number, and the first number is greater than 1.

Method 2:
The MAC layer of the terminal equipment selects an SSB or CSI-RS, and determines the first number of ROs corresponding to the selected SSB or CSI-RS.

In this method, the MAC layer selects only one SSB or CSI-RS, and corresponding to the selected SSB or CSI-RS, determines multiple ROs (the first number of ROs) according to configuration. The multiple ROs (the first number of ROs) here may be all ROs to which the selected SSB or CSI-RS corresponds, or may be some ROs selected from all ROs to which the selected SSB or CSI-RS corresponds; however, this embodiment is not limited thereto. In addition, a specific selection method is not limited in this embodiment. For example, the method may be based on a principle specified by a network device, or may be based on implementation. And furthermore, this method is applicable to a case where one SSB or one CSI-RS corresponds to multiple ROs.

Method 3:
If the terminal equipment is in an idle or inactive state and is configured with a first number of initial bandwidth parts (BWPs), the MAC layer of the terminal equipment may determine an RO on each initial BWP, thereby obtaining the above first number of ROs.

In this method, the terminal equipment is configured with multiple BWPs, and the MAC layer may determine one RO on each initial BWP, thereby obtaining multiple ROs (the first number of ROs). Moreover, this method is suitable for a single active BWP scenario, that is, only an initial BWP having succeeded in LBT monitoring and transmitted preambles is an active BWP.

Method 4:
If the terminal equipment is in a connected state, the MAC layer of the terminal equipment determine an RO on each configured BWP.

In an existing standard, there are at most four BWPs in a cell, and one of them is in an active state, hence the MAC layer may determine an RO respectively on the four BWPs to obtain four ROs (the first number of ROs). This method is also suitable for a single active BWP scenario. If an RO having succeeded in LBT monitoring is on an active BWP, the terminal equipment may transmit preambles on the active BWP, and if the RO having succeeded in LBT monitoring is not on the active BWP, the terminal equipment may transmit preamble on a BWP having succeeded in LBT monitoring. After the random access procedure, the terminal equipment may return to the active BWP or stay on the BWP transmitting the preambles, and determine that the BWP is an active BWP.

Method 5:
The MAC layer of the terminal equipment determines an RO respectively on a first number of aggregation carriers. This method is suitable for a scenario of carrier aggregation, and the MAC layer may determine one RO on multiple aggregation carriers respectively to obtain multiple ROs (the first number of ROs).

Method 6:
The MAC layer of the terminal equipment determines an RO for each random access random access procedure. This method is suitable for the case of parallel random access. One RO is determined for each random access random access procedure, thereby obtaining multiple ROs (the first number of ROs).

Method 7:

The MAC layer of the terminal equipment determines an RO on each active BWP. This method is suitable for a multi-active BWP scenario. One RO is determined for each active BWP, thereby obtaining multiple ROs (the first number of ROs).

The above methods may be used separately or in a combined manner, which is not limited in this embodiment.

In step 302 of this embodiment, when the physical layer of the terminal equipment determines multiple ROs (the second number of ROs), the physical layer may further determine ROs for performing the LBT monitoring, that is, LBT monitoring is performed for which RO or which ROs.

In one implementation, the physical layer may perform LBT monitoring on all the above second number of ROs. In this implementation, if the LBT monitoring of more than one RO is successful, the physical layer may perform preamble transmission on all successful ROs, or select a part (one or more) of the successful ROs for performing preamble transmission.

In another implementation, the physical layer may select a part of ROs from the above second number of ROs for performing LBT monitoring. In this implementation, if the LBT monitoring of this part of ROs is successful, the physical layer may perform preamble transmission on all of this part of ROs, or select a part (one or more) of the above successful ROs for performing preamble transmission.

In a further implementation, the physical layer may perform LBT monitoring on the above first number of ROs in a chronological order, until a certain condition (referred to as a first condition) is met, such as that a specified number (referred to as a fourth number, which may be one or more) of pieces of LBT monitoring is successful, or LBT monitoring is performed on all the above second number of ROs. In this implementation, if the above specified number of pieces of LBT monitoring is successful, the physical layer may perform preamble transmission on all successful ROs, or select a part (one or more) of them to perform preamble transmission.

The above three implementations are just examples for illustration, and which method is specifically adopted may be dependent on configuration of the network device, or based on standard regulations, or may also be dependent on implementation of the terminal equipment itself, which is not limited in this embodiment.

In step 302 of this embodiment, in the case where the physical layer of the terminal equipment determines multiple ROs (the second number of ROs), the terminal equipment may further determine a reception window starting RAR. In an existing standard, after the MAC layer completes steps of random access resource selection (random access resources and preambles are determined), and random access transmission (calculating target received power and an RA-RNTI, if necessary), etc., it starts a window receiving a random access response (RAR) at a specified PDCCH occasion after a last symbol of the determined random access resources. In this embodiment, as the terminal equipment has determined multiple ROs, the terminal equipment needs further to determine when to start the window receiving the RAR (referred to as an RAR reception window).

In this embodiment, the terminal equipment may start the RAR reception window according to the above first number of ROs (that is, the ROs determined by the MAC layer) or according to the above second number of ROs (that is, the ROs determined by the physical layer).

In one implementation, the terminal equipment may determine one RAR reception window, that is, maintaining one RAR reception window. The following methods may be used.

Method 1:

If the physical layer of the terminal equipment performs preamble transmission only on one RO, an RO starting the RAR reception window is the RO transmitting the preambles.

In this method, the MAC layer determines one or more ROs, and when the MAC layer instructs the physical layer to perform preamble transmission, the physical layer performs preamble transmission only on one RO, and the terminal equipment starts the RAR reception window on the RO performing preamble transmission.

Method 2:

If the physical layer of the terminal equipment performs preamble transmission on multiple ROs, an RO starting the RAR reception window is the first or last RO in the multiple ROs.

In this method, the MAC layer determines one or more ROs. When the MAC layer instructs the physical layer to perform preamble transmission, the physical layer performs preamble transmission on multiple ROs, and the terminal equipment starts the RAR reception window on the first or last RO in the ROs performing preamble transmission.

In this method, if the terminal equipment starts the RAR reception window on the first RO performing preamble transmission, the terminal equipment may further restart the RAR reception window on a subsequent RO performing preamble transmission, or extend a window length of the RAR reception window, or stop a current RAR reception window and start a new RAR reception window.

Both the above method 1 and method 2 take the ROs performing preamble transmission into account only.

Method 3:

If LBT monitoring of only one RO is successful, an RO starting the RAR reception window is the RO succeeding in LBT monitoring.

In this method, if there is only one RO succeeding in LBT monitoring, the terminal equipment starts the RAR reception window on the RO succeeding in LBT monitoring.

Method 4:

If LBT monitoring of multiple ROs is successful, an RO starting the RAR reception window is the first or last RO in the ROs succeeding in LBT monitoring.

In this method, if there are multiple ROs succeeding in LBT monitoring, the terminal equipment may start the RAR reception window on the first RO or the last RO in the ROs succeeding in LBT monitoring.

In this method, if the terminal equipment starts the RAR reception window on the first RO succeeding in LBT monitoring, the terminal equipment may further restart the RAR reception window on each subsequent RO succeeding in LBT monitoring, or extend a window length of the RAR reception window, or stop a current RAR reception window and start a new RAR reception window.

Both the above method 3 and method 4 take all the ROs succeeding in LBT monitoring into account.

Method 5:

If only one RO has performed LBT monitoring, an RO starting the RAR reception window is the RO performing LBT monitoring.

In this method, if only one RO has performed LBT monitoring, the terminal equipment may start the RAR reception window on the RO performing LBT monitoring.

Method 6:

If multiple ROs have performed LBT monitoring, an RO starting the RAR reception window is the first or last RO in the ROs performing LBT monitoring.

In this method, if multiple ROs have performed LBT monitoring, the terminal equipment may start the RAR reception window on the first RO or the last RO in the ROs performing LBT monitoring.

In this method, if the terminal equipment starts the RAR reception window on the first RO performing LBT monitoring, the terminal equipment may further restart the RAR reception window on each subsequent RO performing LBT monitoring, or extend a window length of the RAR reception window, or stop a current RAR reception window and start a new RAR reception window.

Both the above method 5 and method 6 take all the ROs performing LBT monitoring into account.

Method 7:

If the MAC layer of the terminal equipment determines an RO, an RO starting the RAR reception window is the RO determined by the MAC layer of the terminal equipment.

In this method, if the MAC layer only provides one RO, the terminal equipment may start the RAR reception window on the RO provided by the MAC layer.

Method 8:

If the MAC layer of the terminal equipment determines multiple ROs, an RO starting the RAR reception window is the first or last RO in the multiple ROs determined by the MAC layer of the terminal equipment.

In this method, if the MAC layer provides multiple ROs, the terminal equipment may start the RAR reception window on the first RO or the last RO in the ROs provided by the MAC layer.

In this method, if the terminal equipment starts the RAR reception window on the first RO provided by the MAC layer, the terminal equipment may further restart the RAR reception window on each subsequent RO provided by the MAC layer, or extend a window length of the RAR reception window, or stop a current RAR reception window and start a new RAR reception window.

Both the above method 7 and method 8 take all the ROs provided by the MAC layer into account.

In another implementation, the terminal equipment may also determine multiple RAR reception windows, that is, maintaining multiple RAR reception windows. The following methods may be used.

Method 1:

If the physical layer of the terminal equipment performs preamble transmission at multiple ROs, the terminal equipment starts one RAR reception window on each one or each group of ROs transmitting the preambles, and in a case of starting the RAR reception window on each group of ROs, an RO starting the RAR reception window is the first or last RO in the multiple ROs transmitting the preambles.

In this method, the ROs performing preamble transmission are taken into account. When the MAC layer instructs the physical layer to perform preamble transmission and the physical layer performs preamble transmission on multiple ROs, the terminal equipment starts the RAR reception window on each RO performing preamble transmission, or the terminal equipment may group the ROs performing preamble transmission, and start one RAR reception window on each group.

In this method, a rule for grouping may be that: one group of ROs are ROs to which one SSB or one CSI-RS corresponds, or one group of ROs are ROs on one channel or one BWP, or ROs on one cell. However, this embodiment is not limited thereto, and the ROs performing preamble transmission may also be grouped according to other rules.

Method 2:

If LBT monitoring of multiple ROs is successful, the terminal equipment starts one RAR reception window on each one or each group of ROs succeeding in LBT monitoring, and in a case of starting one RAR reception window on each group of ROs, an RO starting the RAR reception window is the first or last RO in the multiple ROs succeeding in LBT monitoring.

In this method, the ROs succeeding in LBT monitoring are taken into account. If there are multiple ROs succeeding in LBT monitoring, the terminal equipment may start the RAR reception window on each RO succeeding in LBT monitoring, or the terminal equipment may group the ROs succeeding in LBT monitoring, and start one RAR reception window on each group.

In this method, a rule for grouping is identical to that in method 1, which shall not be described herein any further.

Method 3:

If multiple ROs perform LBT monitoring, the terminal equipment starts one RAR reception window on each or each group of ROs performing LBT monitoring, and in a case of starting one RAR reception window on each group of ROs, an RO starting the RAR reception window is the first or the last RO in the ROs performing LBT monitoring.

In this method, all ROs performing LBT monitoring are taken into account. If there are multiple ROs performing LBT monitoring, the terminal equipment may start the RAR reception window on each RO performing LBT monitoring, or the terminal equipment may group the ROs performing LBT monitoring, and start one RAR reception window on each group.

In this method, a rule for grouping is identical to that in method 1, which shall not be described herein any further.

Method 4:

If the MAC layer of the terminal equipment determines multiple ROs, the terminal equipment starts one RAR reception window on each one or each group of ROs determined by the MAC layer of the terminal equipment, and an RO starting the RAR reception window is the first or last RO in the multiple ROs determined by the MAC layer of the terminal equipment.

In this method, all ROs provided by the MAC layer are taken into account. If there are multiple ROs provided by MAC layer, the terminal equipment may start the RAR reception window on each RO provided by the MAC layer, or the terminal equipment may group the ROs provided by the MAC layer, and start one RAR reception window on each group.

In this method, a rule for grouping is identical to that in method 1, which shall not be described herein any further.

With the method of this embodiment, the RAR reception window is started. When there are multiple ROs, an occasion of starting the RAR reception window may be determined, thereby maintaining the RAR reception window. Based on this method, the terminal side and the network side have a consistent understanding on the maintenance of the RAR reception window, so that the network device may complete the RAR transmission within the RAR reception window, thereby improving a success rate of random access.

This embodiment takes preamble transmission as an example for description. However, this embodiment is not limited thereto, and the method may also be applicable to transmission of msg.3, such as determining multiple transmission opportunities for multiple msg.3, and maintaining one or more contention resolution timers corresponding to msg.3, which shall not be described herein any further.

With the method of this embodiment, opportunities for transmitting the preambles are increased, and various problems generated when the opportunities for transmitting the preambles are increased are solved.

Embodiment 2

The embodiment of this disclosure provides a method for processing LBT monitoring failures, applicable to a terminal equipment. This method may be used in combination with the method of Embodiment 1, or may be used separately, with contents identical to those in Embodiment 1 being not going to be described herein any further.

Figure 4:
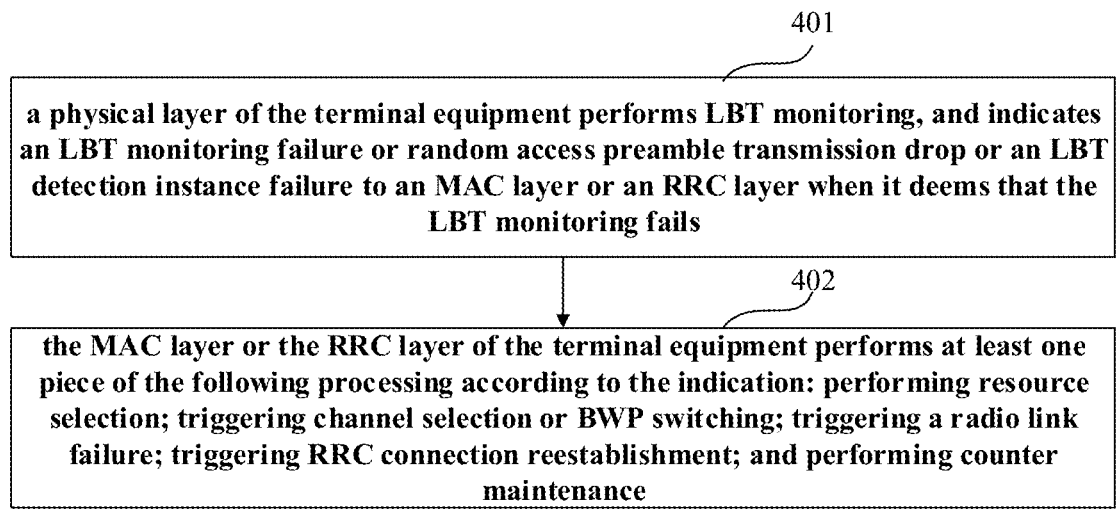
FIG. 4 is a schematic diagram of the method for processing LBT monitoring failures of Embodiment 2.

FIG. 4 is a schematic diagram of the method for processing LBT monitoring failures of this embodiment. As shown in FIG. 4, the method includes:

step 401: a physical layer of the terminal equipment performs LBT monitoring, and indicates an LBT monitoring failure or random access preamble transmission drop or an LBT detection instance failure to an MAC layer or an RRC layer when it deems that the LBT monitoring fails; and step 402: the MAC layer or the RRC layer of the terminal equipment performs at least one piece of the following processing according to the indication: performing resource selection; triggering channel selection or BWP switching; triggering a radio link failure; triggering RRC connection reestablishment; and performing counter maintenance.

In step 401 of this embodiment, the physical layer may deem that the LBT monitoring fails when at least one of the following conditions is satisfied:

Condition 1:
One LBT monitoring result is busy.
in this condition, after the physical layer performs one LBT monitoring, if it is determined to be busy, it deems that the LBT monitoring fails. It may indicate information on LBT monitoring failure or information on preamble transmission drop to the MAC layer or the RRC layer, or it does not perform the above indications, but decides subsequent processing by itself, which are as described in Embodiment 1, and shall not be described herein any further.

Condition 2:
One or more LBT monitoring result of a transmission opportunity (RO) of preambles indicated once by the MAC layer of the terminal equipment are all busy.

In this condition, the MAC layer may indicate (or determine) one RO, and the physical layer performs one or more (parallel or serial) LBT monitoring for the RO. If all of them are determined to be busy, it is deemed that the LBT monitoring fails.

Condition 3:
For multiple LBT monitoring within a period of time, the number of instances of results of LBT monitoring being busy reaches a first number.

In this condition, the physical layer may perform multiple LBT monitoring within a certain period of time, acknowledge that the number of times of being busy reaches a certain number, and deem that the LBT monitoring fails.

Condition 4:
For multiple LBT monitoring, a proportion of results of LBT monitoring being busy reaches a first proportion.

In this condition, the physical layer may perform multiple LBT monitoring, acknowledge that a proportion of times of being busy in a total number of times of performing LBT monitoring reaches a ratio, and deem that the LBT monitoring fails.

Condition 5:
The number of instances of results of LBT monitoring being busy reaches a second number, and within timing of a first timer, the number of instances of results of LBT monitoring being idle does not reach a third number, wherein the first timer is started when the number of instances of results of LBT monitoring being busy reaches the second number.

In this condition, the LBT instance refers to a situation where one LBT monitoring is performed, that is, when condition 1 is satisfied, a monitoring result of an LBT instance is deemed as being failed.

Condition 6:
After a second timer expires, the number of instances of results of LBT monitoring being busy reaches a fourth number, wherein the second timer is started when a monitoring result of an LBT instance is busy.

In this condition, a concept of the LBT instance is identical to what is described above, which shall not be described herein any further.

Condition 7:
On a channel or a BWP, for multiple LBT monitoring within a period of time, the number of instances of a result of LBT monitoring being busy reaches a fifth number.

Condition 8:
On a channel or a BWP, for multiple LBT monitoring, a proportion of results of LBT monitoring being busy reaches a second proportion.

Condition 9:
On a channel or a BWP, the number of instances of a result of LBT monitoring being busy reaches a sixth number, and within timing of a third timer, the number of instances of results of LBT monitoring being idle does not reach a seventh number, wherein the third timer is started when the number of instances of results of LBT monitoring being busy reaches the sixth number.

Condition 10:
On a channel or a BWP, after a fourth timer expires, the number of instances of results of LBT monitoring being busy reaches an eighth number, wherein the fourth timer is started when a monitoring result of an LBT instance is busy.

Condition 11:
For an SSB and/or a CSI-RS, for multiple LBT monitoring within a period of time, the number of instances of results of LBT monitoring being busy reaches a ninth number.

Condition 12:
For an SSB and/or a CSI-RS, for multiple LBT monitoring, a proportion of results of LBT monitoring being busy reaches a third proportion.

Condition 13:
For an SSB and/or a CSI-RS, the number of instances of results of LBT monitoring being busy reaches a tenth number, and within timing of a fifth timer, the number of instances of results of LBT monitoring being idle does not reach an eleventh number, wherein the fifth timer is started when the number of instances of results of LBT monitoring being busy reaches the tenth number.

Condition 14:
For an SSB and/or a CSI-RS, after a sixth timer expires, the number of instances of results of LBT monitoring being busy reaches a twelfth number, wherein the sixth timer is started when a monitoring result of an LBT instance is busy.

Above conditions 7-10 are similar to above conditions 3-6, and what is different from conditions 3-6 is that the LBT monitoring is performed for a channel or a BWP. In a case of satisfying any one of conditions 7-10, the physical layer of the terminal equipment may further provide the MAC layer with information on a channel or a BWP on which an LBT monitoring fails.

Above conditions 11-14 are similar to above conditions 3-6, and what is different from conditions 3-6 is that the LBT monitoring is performed for an SSB and/or a CSI-RS. In a case of satisfying any one of conditions 11-14, the physical layer of the terminal equipment may further provide the MAC layer with index of an SSB and/or a resource identifier of a CSI-RS of which LBT monitoring fails.

"A period of time" in conditions 3, 7 11 may be described as a time interval T or a period T, and this embodiment is not limited thereto.

In step 402 of this embodiment, when an indication of an LBT monitoring failure from the physical layer or an indication of drop of current preamble transmission or an indication of an LBT detection instance failure is received, the MAC layer may perform resource selection, for example, the value of a preamble transmission counter is not increased and power ramp is not performed, or the value of a preamble transmission counter is increased but power ramp is not performed. Here, the indication of drop of preamble transmission may also be understood as an indication of an LBT monitoring failure, which is not limited in this embodiment.

In this embodiment, in consideration that in a contention-based random access procedure, before msg.3 is transmitted, LBT monitoring will also be performed, and msg.3 transmission will maintain a contention resolution timer, hence, the method of this embodiment may also be applicable to msg.3, that is, when the transmission of msg.3 is cancelled due to an LBT monitoring failure, the random access resource selection is directly performed without waiting for expiration of the contention resolution timer.

With the method of this embodiment, in the case of LBT failure, the terminal equipment may directly perform resource selection without waiting for the time of the RAR reception window, thereby speeding up the random access procedure and lowering energy consumption of the terminal equipment.

In step 402 of this embodiment, upon receiving the indication of an LBT monitoring failure from the physical layer or an indication of drop of current preamble transmission or an indication of an LBT detection instance failure, the MAC layer may perform channel selection or BWP switching; or the MAC layer may trigger channel selection or BWP switching when a first condition is satisfied. The first condition here is at least one of the above conditions 7-10, which shall not be described herein any further.

In this embodiment, as described above, the physical layer of the terminal equipment may further provide information on the channel or BWP on which the LBT monitoring fails to the MAC layer, that is, the MAC layer of the terminal equipment may further receive the channel or BWP on which the LBT monitoring fails, so as to perform determination of the above conditions.

In this embodiment, one BWP may include multiple channels (for example, in a connected state), and it may occur that LBT monitoring of a part of the channels fails while LBT monitoring of another part of the channels succeeds. In this embodiment, as long as there is an LBT monitoring failure, it is deemed that LBT monitoring on this BWP fails.

In this embodiment, when channel selection or BWP switching occurs, the random access procedure is terminated or ended; after the channel selection or BWP switching is completed, a new random access procedure may be initiated, or channel selection or BWP switching is allowed to be performed during the random access procedure.

With the method of this embodiment, when LBT monitoring fails or a condition (the first condition) is satisfied, the terminal equipment may perform channel selection or BWP switching, thereby avoiding performing random access on a channel or a BWP where LBT monitoring always fails. In this way, energies may be saved for the terminal equipment and better user experiences may be provided. This method is applicable to terminal equipments in all states, such as an idle state, an inactive state and a connected state.

In step 402 of this embodiment, upon receiving the indication of an LBT monitoring failure from the physical layer or an indication of drop of current preamble transmission or an indication of an LBT detection instance failure, the MAC layer may further trigger a radio link failure or indirectly trigger connection reestablishment. Subsequent actions of the terminal equipment are identical to those after a radio link failure occurs defined in an existing standard, with a difference of triggering conditions.

For example, the MAC layer deems that the random access fails in receiving the above indications, if the random access occurs in a specific cell (referred to as a first cell), such as a PCell or a PSCell, the terminal equipment transmits indication information (referred to as first indication information) to the network device, and a problem of random access is indicated via the first indication information. Reference may be made to existing standards for definition of the above PCell and PSCell, which are collectively referred to as "primary cells" herein.

For another example, the MAC layer may also deem that the random access fails when a second condition is satisfied. The second condition here is at least one of the above conditions 3-6, and shall not be described herein any further.

With the method of this embodiment, in the case of LBT monitoring failure, the terminal equipment may announce "radio link failure" or "channel busy", thereby avoiding performing random access on a cell or a channel of a cell where LBT monitoring always fails. In this way, energies may be saved for the terminal equipment, long-term service interruption may be avoided, and better user experiences may be provided. This method is applicable to a terminal equipment in a connected state.

In step 402 of this embodiment, upon receiving the indication of an LBT monitoring failure from the physical layer or an indication of drop of current preamble transmission or an indication of an LBT detection instance failure, the RRC layer may further trigger a radio link failure or trigger RRC connection reestablishment.

For example, the RRC layer may initiate a connection reestablishment procedure in receiving the indication, such as transmitting second indication information to the network device, and triggering RRC connection reestablishment via the second indication information. The second indication information may include information on an LBT monitoring failure, and a particular form is not limited in this embodiment. And the second indication information may further be included in an RRC reestablishment request message (RRCReestablishmentRequest) to reestablish RRC connection with a network; however, this embodiment is not limited thereto.

For another example, the RRC layer may further initiate a connection reestablishment procedure when a third condition is met, and trigger subsequent actions of the terminal equipment. As described above, the third condition here may be at least one of the above conditions 3-6, which shall not be described herein any further.

For a further example, the RRC layer may deem that a radio link fails after receiving the above indication, and trigger the terminal equipment to perform subsequent actions. The actions of the terminal equipment after the radio link fails in an existing standard may be referred to, and shall not be described herein any further.

For yet another example, the RRC layer may further deem (or trigger) that a radio link fails when a fourth condition is satisfied, and trigger subsequent actions of the terminal equipment. The fourth condition here may be at least one of the above conditions 3-6, which shall not be described herein any further.

With the method of this embodiment, when LBT monitoring fails or a condition (the third or fourth condition) is satisfied, the terminal equipment may initiate an RRC connection reestablishment procedure to the network device or deems that a radio link fails, and select a new cell or another channel in the same cell, thereby avoiding performing random access on a cell or a channel in the cell where LBT monitoring always fails. In this way, energies may be saved for the terminal equipment, long-term service interruption may be avoided, and better user experiences may be provided. This method is applicable to a terminal equipment in a connected state.

In step 402 of this embodiment, upon receiving the indication of an LBT monitoring failure from the physical layer or an indication of drop of current preamble transmission or an indication of an LBT detection instance failure, the MAC layer may maintain the counter.

In this embodiment, in the above method, it is possible that all LBT monitoring fails, causing preamble transmission to be dropped, that is, the preamble transmission is not performed, in which case if the ongoing random access is not stopped, it may cause that a problem occurs in the terminal equipment. For example, when the terminal equipment is in the connected state, random access attempts for a long time or even with no end will cause service interruption, deterioration of user experiences, and even power exhaustion. The random access attempts include performing random access selection, determining random access resources, instructing the physical layer to transmit the preambles, performing LBT monitoring by the physical layer, LBT monitoring failing, and performing random access selection again after an RAR reception window expires.

In order to solve the above problems, in this embodiment, a counter maintenance mechanism is also introduced.

For example, for each RO on which LBT monitoring is performed, if LBT monitoring of the RO fails, the value of a preamble transmission counter (such as PREAMBLE_TRANSMISSION_COUNTER) is incremented by 1. Here, the LBT monitoring failure causes that the preamble transmission is dropped, and the situations where LBT monitoring failure will be described in the following embodiments.

For another example, for each RO on which LBT monitoring is performed, if LBT monitoring of the RO fails and the RAR reception window expires, the value of a preamble transmission counter (such as PREAMBLE_TRANSMISSION_COUNTER) is incremented by 1. Here, the LBT monitoring failure causes that the preamble transmission is dropped, and the situations where LBT monitoring failure will be described in the following embodiments.

With the above mechanism, when the LBT monitoring fails, although the preamble transmission is not performed, the value of a retransmission counter is still incremented by 1, which may limit the number of random access attempts, thereby reducing service interruption, improving user experiences, and saving power consumption of the terminal.

The above two mechanisms are examples only, and this embodiment is not limited thereto.

For still another example, a new counter may be introduced. When the random access procedure is initiated, the value of the counter is set to be 1; in a case of LBT monitoring failure, the value of the counter is added by 1, and until the value of the counter reaches a maximum value, it is deemed that the random access procedure is completed. Here, the completion of the random access procedure may be successful completion or unsuccessful completion.

In this embodiment, "drop" can also be replaced by similar words, such as "cancel" or "fail" or "interrupt" or "suspend", and all of which indicate a failure of an indicated RO applied by a physical layer and/or that no preamble is transmitted to the network device.

In this embodiment, the processing of the physical layer or the MAC layer or the RRC layer of the terminal equipment is described in different implementations. These implementations may be used separately or in a combined manner, which are not limited in this embodiment.

With the method of this embodiment, when one or more ROs are confirmed by the MAC layer, different processing mechanisms are provided when LBT monitoring fails, which shortens a response time after LBT monitoring fails, and improves a success rate of the random access.

Embodiment 3

Figure 5:
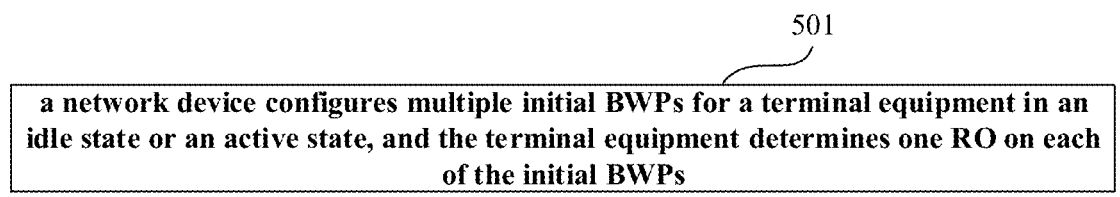
FIG. 5 is a schematic diagram of the configuration method of Embodiment 3.

The embodiment of this disclosure provides a configuration method, applicable to a network device. This method is processing at a network side corresponding to the methods in Embodiment 1 and Embodiment 2, with contents identical to those in Embodiment 1 and Embodiment 2 being not going to be described herein any further. FIG. 5 is a schematic diagram of the configuration method of this embodiment. As shown in FIG. 5, the method includes:

step 501: a network device configures multiple initial BWPs for a terminal equipment in an idle state or an active state, and the terminal equipment determines one RO on each of the initial BWPs.

In this embodiment, the network device configures the terminal equipment with multiple initial BWPs, and the terminal equipment may determine one RO on each initial BWP, a particular method being as described in Embodiment 1, which shall not be described herein any further. With this method, transmission opportunities for preambles are increased, and a success rate of random access is improved.

In this embodiment, as described in Embodiment 2, the network device may further receive first indication information transmitted by the terminal equipment, and determine according to the first indication information that an active BWP is a BWP transmitting the first indication information. And subsequent processing may be identical to that in an existing standard, which shall not be described herein any further.

With this method, a success rate of random access is improved.

Embodiment 4

The embodiment of this disclosure provides an apparatus for transmitting random access preambles, configured in a terminal equipment. As principles of the apparatus for solving problems are similar to that of the method in Embodiment 1, reference may be made to the implementation of the method in Embodiment 1 for implementation of this apparatus, with identical contents being not going to be described herein any further.

Figure 6:
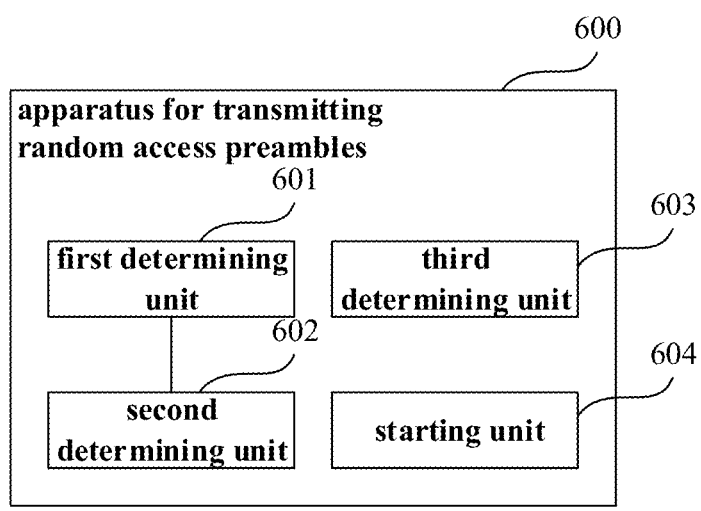
FIG. 6 is a schematic diagram of the apparatus for transmitting random access preambles of Embodiment 4.

FIG. 6 is a schematic diagram of the apparatus for transmitting random access preambles of this embodiment. As shown in FIG. 6, an apparatus 600 for transmitting random access preambles of this embodiment includes: a first determining unit 601 and a second determining unit 602.

The first determining unit 601 is configured to, on a media access control (MAC) layer of the terminal equipment, determine a first number of random access transmission opportunities (RO) used for transmitting preambles or select a downlink reference signal corresponding to an RO used for transmitting preambles; and the second determining unit 602 is configured to, on a physical layer of the terminal equipment, determine a second number of ROs used for transmitting preambles according to the first number of ROs or the downlink reference signal, both the first number and the second number being greater than 1.

In this embodiment, the first determining unit 601 may determine the first number of ROs in at least one of the following methods:

selecting a third number of synchronization signal blocks/broadcast channel blocks (SSBs) and/or channel state information reference signals (CSI-RSs) by the MAC layer of the terminal equipment, and determining one RO based on each selected SSB and/or CSI-RS, so as to obtain the first number of ROs;

selecting one SSB or one CSI-RS by the MAC layer of the terminal equipment, and determining the first number of ROs corresponding to the selected SSB or CSI-RS;

if the terminal equipment is in an idle state or an inactive state and the terminal equipment configures a first number of initial bandwidth parts (BWPs), determining one RO on each initial BWP;

if the terminal equipment is in a connected state, determining one RO on each configured BWP by the terminal equipment;

determining one RO respectively on a first number of aggregation carriers by the MAC layer of the terminal equipment;

determining one RO for each random access procedure by the terminal equipment; and determining one RO on each active BWP by the terminal equipment.

In this embodiment, as shown in FIG. 6, the apparatus 600 may further include:

a third determining unit 603 configured to, on the physical layer of the terminal equipment, determine RO(s) used for performing listen before talk (LBT) monitoring in at least one of the following methods:

performing LBT monitoring on all the second number of ROs;

selecting a part of the second number of ROs and performing LBT monitoring thereon; and performing LBT monitoring on the second number of ROs in a chronological order, until a first condition is satisfied, the first condition being that a fourth number of pieces of LBT monitoring succeed or LBT monitoring is performed on all the second number of ROs.

In this embodiment, as shown in FIG. 6, the apparatus 600 may further include:

a starting unit 604 configured to start a random access response (RAR) reception window according to the first number of ROs or the second number of ROs.

In this embodiment, the number of the RAR reception window may be 1, and an RO starting the RAR reception window may be any one of the following:

if the physical layer of the terminal equipment performs preamble transmission on one RO only, the RO starting the RAR reception window is the RO transmitting the preambles;

if the physical layer of the terminal equipment performs preamble transmission on multiple ROs, the RO starting the RAR reception window is a first RO or a last RO in the multiple ROs;

if LBT monitoring of only one RO succeeds, the RO starting the RAR reception window is the RO succeeding in LBT monitoring;

if LBT monitoring of multiple ROs succeeds, the RO starting the RAR reception window is a first RO or a last RO in the ROs succeeding in LBT monitoring;

if LBT monitoring of only one RO is performed, the RO starting the RAR reception window is the RO on which the LBT monitoring is performed;

if LBT monitoring of multiple ROs is performed, the RO starting the RAR reception window is a first RO or a last RO in the ROs on which the LBT monitoring is performed;

if the MAC layer of the terminal equipment determines one RO, the RO starting the RAR reception window is the RO determined by the MAC layer of the terminal equipment; and if the MAC layer of the terminal equipment determines multiple ROs, the RO starting the RAR reception window is a first RO or a last RO in the multiple ROs determined by the MAC layer of the terminal equipment.

In this embodiment, the number of the RAR reception window may be plural, and an RO starting the RAR reception windows may be any one of the following:

if the physical layer of the terminal equipment performs preamble transmission on multiple ROs, the terminal equipment starts an RAR reception window on each RO or each group of ROs transmitting the preambles, and in case of starting an RAR reception window on each group of ROs, the RO starting the RAR reception windows is a first RO or a last RO in the multiple ROs transmitting the preambles;

if LBT monitoring of multiple ROs succeeds, the terminal equipment starts an RAR reception window on each RO or each group of ROs succeeding in LBT monitoring, and in case of starting an RAR reception window on each group of ROs, the RO starting the RAR reception window is a first RO or a last RO in the multiple ROs succeeding in LBT monitoring;

if LBT monitoring of multiple ROs are performed, the terminal equipment starts an RAR reception window on each RO or each group of ROs on which the LBT monitoring is performed, and in case of starting an RAR reception window on each group of ROs, the RO starting the RAR reception window is a first RO or a last RO in the multiple ROs on which the LBT monitoring is performed; and if the MAC layer of the terminal equipment determines multiple ROs, the terminal equipment starts an RAR reception window on each RO or each group of ROs determined by the MAC layer of the terminal equipment, and the RO starting the RAR reception window is a first RO or a last RO in the multiple ROs determined by the MAC layer of the terminal equipment.

In this embodiment, one group of ROs are ROs to which one SSB or one CSI-RS corresponds, or one group of ROs are ROs on one channel or one BWP, or ROs on one cell.

With the apparatus of this embodiment, a success rate of random access may be improved.

Embodiment 5

The embodiment of this disclosure provides an apparatus for processing LBT monitoring failures, configured in a terminal equipment. As principles of the apparatus for solving problems are similar to that of the method in Embodiment 2, reference may be made to the implementation of the method in Embodiment 2 for implementation of this apparatus, with identical contents being not going to be described herein any further.

Figure 7:
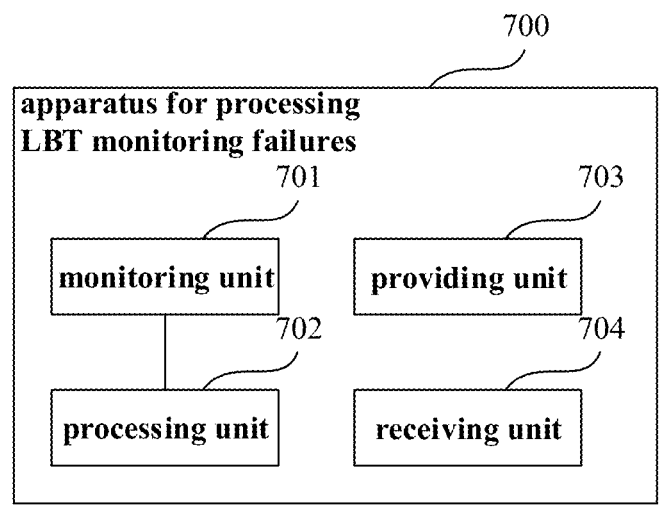
FIG. 7 is a schematic diagram of the apparatus for processing LBT monitoring failures of Embodiment 5.

FIG. 7 is a schematic diagram of the apparatus for processing LBT monitoring failures of this embodiment. As shown in FIG. 7, an apparatus 700 for processing LBT monitoring failures of this embodiment includes: a monitoring unit 701 and a processing unit 702.

The monitoring unit 701 performs LBT monitoring on a physical layer of the terminal equipment, and indicates an LBT monitoring failure or preamble transmission drop or an LBT detection instance failure to an MAC layer or an RRC layer when the LBT monitoring is deemed as failure; and the processing unit 702 performs at least one piece of the following processing on the MAC layer or the RRC layer of the terminal equipment according to the indication: performing resource selection; triggering channel selection or BWP switching; triggering a radio link failure; triggering RRC connection reestablishment; and performing counter maintenance.

In this embodiment, the monitoring unit 701 deems that the LBT monitoring fails at the physical layer of the terminal equipment when at least one of conditions 1-14 in Embodiment 2 is satisfied.

In this embodiment, as shown in FIG. 7, the apparatus 700 may further include:

a providing unit 703 configured to, on the physical layer of the terminal equipment, provide information on a channel or a BWP on which an LBT monitoring fails, to the MAC layer; and/or, on the physical layer of the terminal equipment, provide an index of an SSB of which an LBT monitoring fails and/or a resource identifier of a CSI-RS of which an LBT monitoring fails, to the MAC layer.

In this embodiment, the processing unit 702 may trigger channel selection or BWP switching on the MAC layer of the terminal equipment according to the indication when a first condition is satisfied, the first condition being at least one of conditions 3-6 in Embodiment 2.

In this embodiment, as shown in FIG. 7, the apparatus 700 may further include:

a receiving unit 704 configured to, at the MAC layer of the terminal equipment, receive information, transmitted by the physical layer, on a channel or a BWP on which an LBT monitoring fails.

In this embodiment, the BWP includes multiple channels, and the LBT monitoring failure on the BWP refers to that LBT monitoring on any one channel of the BWP fails.

In this embodiment, the processing unit 702 may also trigger a radio link failure on the MAC layer of the terminal equipment according to the indication, which includes:

when the indication is received on the MAC layer, deeming that random access fails, transmitting first indication information to the network device when the random access occurs in a first cell, and indicating a random access issue via the first indication information, wherein the first cell is a primary cell; or when a second condition is satisfied on the MAC layer according to the indication, deeming that random access fails, the second condition being at least one of the conditions 3-6 in Embodiment 2.

In this embodiment, the processing unit 702 may also rigger RRC connection reestablishment on the MAC layer of the terminal equipment according to the indication, which includes:

initiating connection reestablishment procedure when the RRC layer receives the indication; or initiating connection reestablishment procedure when a third condition is satisfied on the MAC layer according to the indication, the third condition being at least one of the conditions 3-6 in Embodiment 2.

In this embodiment, the processing unit 702 may also trigger a radio link failure on the RRC layer of the terminal equipment according to the indication, which includes:

when the indication is received on the RRC layer, deeming that the radio link fails; or when a fourth condition is satisfied on the RRC layer according to the indication, deeming that the radio link fails, the fourth condition being at least one of the above conditions 3-6.

In this embodiment, the processing unit 702 may also perform counter maintenance on the MAC layer of the terminal equipment according to the indication, which includes:

performing counter maintenance on the MAC layer of the terminal equipment according to any one of the following mechanism:

for each RO on which LBT monitoring is performed, if the LBT monitoring of the RO fails, incrementing a preamble transmission counter by 1;

for each RO on which LBT monitoring is performed, if the LBT monitoring of the RO fails and an RAR reception window expires, incrementing a preamble transmission counter by 1; and in case of LBT monitoring failure, incrementing a first counter by 1 until the value of the first counter reaches a maximum value.

With the apparatus of this embodiment, a success rate of random access may be improved.

Embodiment 6

The embodiment of this disclosure provides a configuration apparatus, configured in a network device. As principles of the apparatus for solving problems are similar to that of the method in Embodiment 3, reference may be made to the implementation of the method in Embodiment 3 for implementation of this apparatus, with identical contents being not going to be described herein any further.

Figure 8:
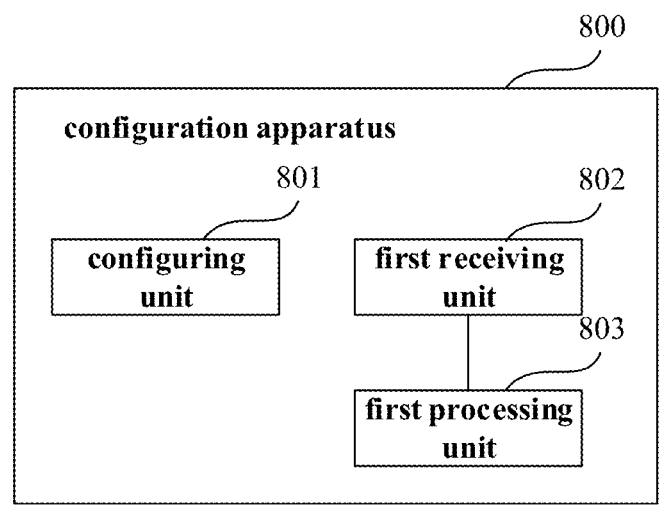
FIG. 8 is a schematic diagram of the configuration apparatus of Embodiment 6.

FIG. 8 is a schematic diagram of the configuration apparatus of this embodiment. As shown in FIG. 8, a configuration apparatus 800 of this embodiment includes:

a configuring unit 801 configured to configure multiple initial BWPs for a terminal equipment in an idle state or an active state, one RO on each of the initial BWPs being determined by the terminal equipment.

In this embodiment, as shown in FIG. 8, the configuration apparatus 800 may further include:

a first receiving unit 802 configured to receive first indication information transmitted by the terminal equipment; and a first processing unit 803 configured to determine that an active BWP is a BWP on which the first indication information is transmitted according to the first indication information.

With the apparatus of this embodiment, a success rate of random access may be improved.

Embodiment 7

The embodiment of this disclosure provides a terminal equipment, including the apparatus as described in Embodiment 4 or 5.

Figure 9:
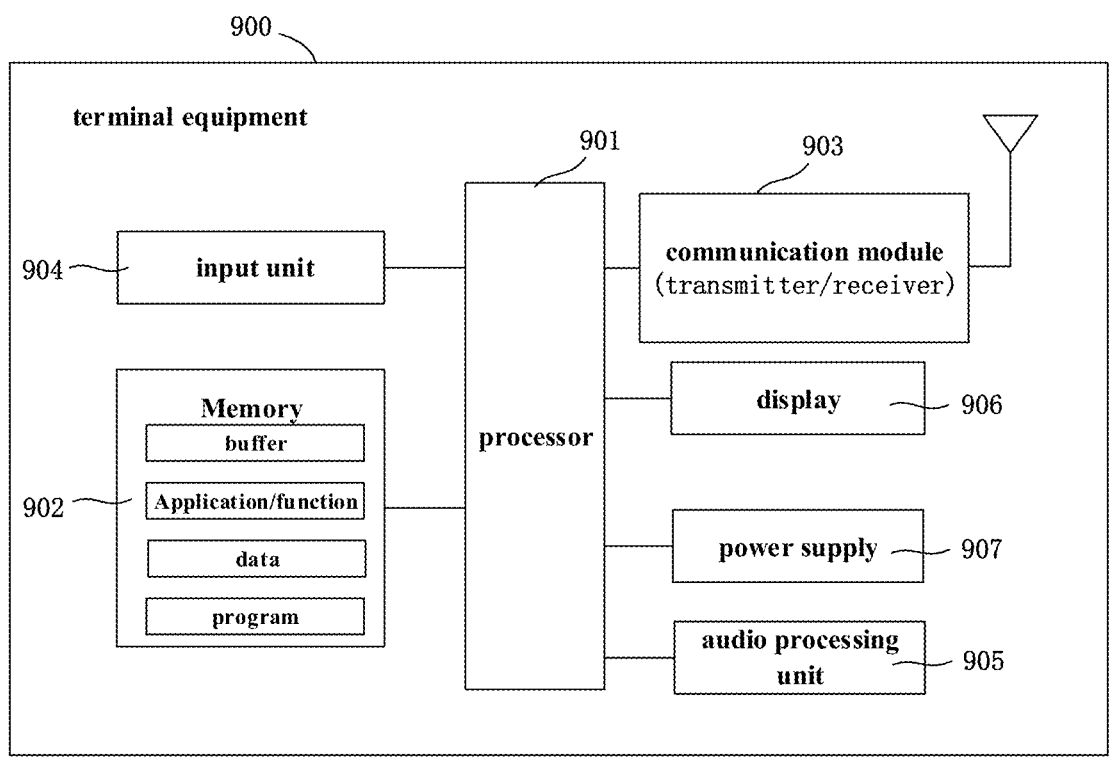
FIG. 9 is a schematic diagram of the terminal equipment of Embodiment 7.

FIG. 9 is a schematic diagram of the terminal equipment of the embodiment of this disclosure. As shown in FIG. 9, a terminal equipment 900 may include a central processor 901 and a memory 902, the memory 902 being coupled to the central processor 901. It should be noted that his figure is illustrative only, and other types of structures may also be used, so as to supplement or replace this structure and achieve a telecommunications function or other functions.

In one implementation, the functions of the apparatus described in Embodiment 4 or 5 may be integrated into the central processor 901, and the functions of the apparatus described in Embodiment 4 or 5 are carried out by the central processor 901; wherein the functions of the apparatus described in Embodiment 4 or 5 are incorporated herein, and shall not be described herein any further.

In another implementation, the apparatus described in Embodiment 4 or 5 and the central processor 901 may be configured separately; for example, the apparatus described in Embodiment 4 or 5 may be configured as a chip connected to the central processor 901, and the functions of the apparatus described in Embodiment 4 or 5 are executed under control of the central processor 901.

As shown in FIG. 9, the terminal equipment 900 may further include a communication module 903, an input unit 904, an audio processor 905, a display 906, and a power supply 907. It should be noted that the terminal equipment 900 does not necessarily include all the parts shown in FIG. 9. Furthermore, the terminal equipment 900 may include parts not shown in FIG. 9, and the related art may be referred to.

As shown in FIG. 9, the central processor 901 is sometimes referred to as a controller or control, which may include a microprocessor or other processor devices and/or logic devices, and the central processor 901 receives input and controls operations of every component of the terminal equipment 900.

The memory 902 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the central processor 901 may execute programs stored in the memory 902, so as to realize information storage or processing, etc. Functions of other parts are similar to those of the related art, which shall not be described herein any further. The parts of the terminal equipment 900 may be realized by specific hardware, firmware, software, or any combination thereof, without departing from the scope of this disclosure.

With the terminal equipment of this embodiment, a success rate of random access may be improved.

Embodiment 8

The embodiment of this disclosure provides a network device, including the apparatus as described in Embodiment 6.

Figure 10:
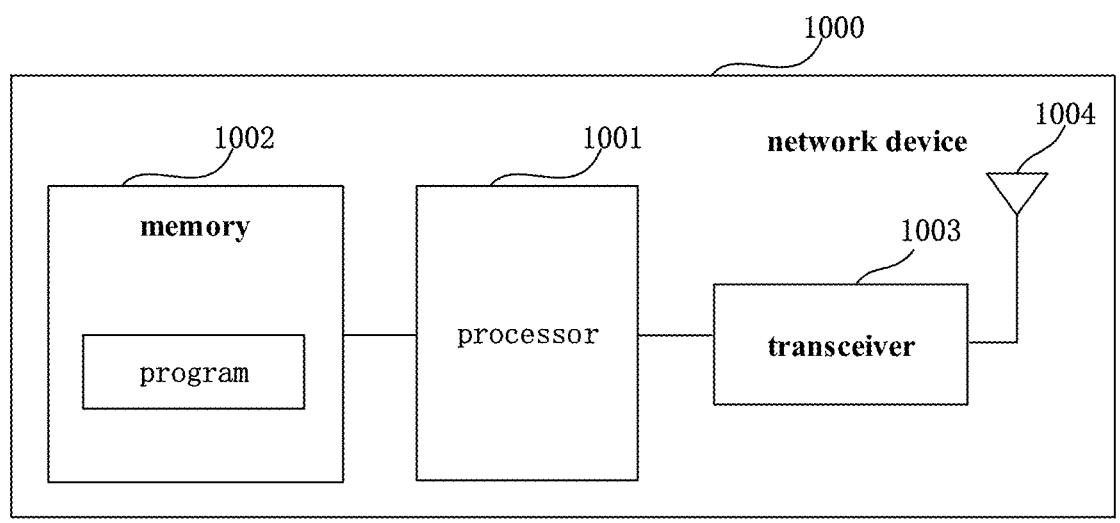
FIG. 10 is a schematic diagram of the network device of Embodiment 8.

FIG. 10 is a schematic diagram of a structure of one implementation of the network device of the embodiment of this disclosure. As shown in FIG. 10, a network device 1000 may include a central processor (CPU) 1001 and a memory 1002, the memory 1002 being coupled to the central processor 1001. The memory 1002 may store various data, and furthermore, it may store a program for data processing, and execute the program under control of the central processing unit 1001, so as to receive various information transmitted by a terminal equipment and transmit various information to the terminal equipment.

In one implementation, the functions of the apparatus described in Embodiment 6 may be integrated into the central processor 1001, and the functions of the apparatus described in Embodiment 6 are carried out by the central processor 1001; wherein the functions of the apparatus described in Embodiment 6 are incorporated herein, and shall not be described herein any further.

In another implementation, the apparatus described in Embodiment 6 and the central processing unit 1001 may be configured separately; for example, the apparatus described in Embodiment 6 may be configured as a chip connected to the central processing unit 1001, and the functions of the apparatus described in Embodiment 6 are executed under control of the central processing unit 1001.

Furthermore, as shown in FIG. 10, the network device 1000 may include a transceiver 1003, and an antenna 1004, etc. Functions of the above components are similar to those in the related art, and shall not be described herein any further. It should be noted that the network device 1000 does not necessarily include all the parts shown in FIG. 10, and furthermore, the network device 1000 may include parts not shown in FIG. 10, and the related art may be referred to.

With the network device of this embodiment, a success rate of random access may be improved.

Embodiment 9

The embodiment of this disclosure provides a communication system, including a network device and a terminal equipment, the network device being, for example, the network device 1000 described in Embodiment 8, and the terminal equipment being, for example, the terminal equipment 900 described in Embodiment 7.

In this embodiment, the terminal equipment is, for example, a UE served by a gNB, and includes conventional compositions and functions of a terminal equipment, in addition to the functions of the apparatus described in Embodiment 4 or 5, which are as described in Embodiment 7, and shall not be described herein any further.

In this embodiment, the network device may be, for example, a gNB in NR, and includes conventional compositions and functions of a network device, in addition to the functions of the apparatus described in Embodiment 6, which are as described in Embodiment 8, and shall not be described herein any further.

With the communication system of this embodiment, a success rate of random access may be improved.

An embodiment of this disclosure provides a computer readable program, which, when executed in a terminal equipment, will cause a computer to carry out the method described in Embodiment 1 or 2 in the terminal equipment.

An embodiment of this disclosure provides a storage medium storing a computer readable program, which will cause a computer to carry out the method described in Embodiment 1 or 2 in a terminal equipment.

An embodiment of this disclosure provides a computer readable program, which, when executed in a network device, will cause a computer to carry out the method described in Embodiment 3 in the network device.

An embodiment of this disclosure provides a storage medium storing a computer readable program, which will cause a computer to carry out the method described in Embodiment 3 in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

1. An apparatus for processing LBT monitoring failures, configured in a terminal equipment, the apparatus including:

a monitoring unit configured to perform LBT monitoring on a physical layer of the terminal equipment, and indicate an LBT monitoring failure or msg.3 transmission drop or an LBT detection instance failure to an MAC layer or an RRC layer when the LBT monitoring fails; and a processing unit configured to perform at least one piece of the following processing on the MAC layer or the RRC layer of the terminal equipment according to the indication:
  performing resource selection;
  triggering channel selection or BWP switching;
  triggering a radio link failure;
  triggering RRC connection reestablishment; and
  performing counter maintenance.

2. The apparatus according to supplement 1, wherein the monitoring unit deems that the LBT monitoring fails at the physical layer of the terminal equipment when at least one of the following conditions is satisfied:

one LBT monitoring result is busy;

for transmission opportunity(ies) of msg.3 indicated by the MAC layer of the terminal equipment, one or more LBT monitoring results is/are being busy;

for multiple LBT monitoring in a period of time, the number of instances with LBT monitoring results being busy reaches a first number;

for multiple LBT monitoring, a proportion with LBT monitoring results being busy reaches a first proportion;

the number of instances with LBT monitoring results being busy reaches a second number, and the number of instances with LBT monitoring results being idle does not reach a third number within timing of a first timer; wherein, the first timer is started when the number of instances with LBT monitoring results being busy reaches the second number;

the number of instances with LBT monitoring results being busy reaches a fourth number after a second timer expires; wherein, the second timer is started when a monitoring result of an LBT instance is busy;

on one channel or one BWP, for multiple LBT monitoring in a period of time, the number of instances with LBT monitoring results being busy reaches a fifth number;

on one channel or one BWP, for multiple LBT monitoring, a proportion with LBT monitoring results being busy reaches a second proportion;

on one channel or one BWP, the number of instances with LBT monitoring results being busy reaches a sixth number, and the number of instances with LBT monitoring results being idle does not reach a seventh number within timing of a third timer; wherein, the third timer is started when the number of instances with LBT monitoring results being busy reaches the sixth number;

on one channel or one BWP, the number of instances with LBT monitoring results being busy reaches an eighth number after a fourth timer expires; wherein, the fourth timer is started when a monitoring result of an LBT instance is busy;

for one SSB and/or one CSI-RS, for multiple LBT monitoring in a period of time, the number of instances with LBT monitoring results being busy reaches a ninth number;

for one SSB and/or one CSI-RS, for multiple LBT monitoring, a proportion with LBT monitoring result being busy reaches a third proportion;

for one SSB and/or one CSI-RS, the number of instances with LBT monitoring results being busy reaches a tenth number, and the number of instances with LBT monitoring results being idle does not reach an eleventh number within timing of a fifth timer; wherein, the fifth timer is started when the number of instances with LBT monitoring results being busy reaches the tenth number; and for one SSB and/or one CSI-RS, the number of instances with LBT monitoring results being busy reaches a twelfth number after a sixth timer expires; wherein, the sixth timer is started when a monitoring result of an LBT instance is busy.

3. The apparatus according to supplement 2, wherein the apparatus further includes:

a providing unit configured to, on the physical layer of the terminal equipment, provide information on a channel or a BWP on which an LBT monitoring fails, to the MAC layer; and/or, on the physical layer of the terminal equipment, provide an index of an SSB of which an LBT monitoring fails and/or a resource identifier of a CSI-RS of which an LBT monitoring fails, to the MAC layer.

4. The apparatus according to supplement 1, wherein the processing unit triggers channel selection or BWP switching on the MAC layer of the terminal equipment according to the indication when a first condition is satisfied, the first condition being at least one of the following:

on one channel or one BWP, for multiple LBT monitoring in a period of time, the number of instances with LBT monitoring results being busy reaches a fifth number;

on one channel or one BWP, for multiple LBT monitoring, a proportion with LBT monitoring results being busy reaches a second proportion;

on one channel or one BWP, the number of instances with LBT monitoring results being busy reaches a sixth number, and the number of instances with LBT monitoring results being idle does not reach a seventh number within timing of a third timer; wherein, the third timer is started when the number of instances with LBT monitoring results being busy reaches the sixth number; and on one channel or one BWP, the number of instances with LBT monitoring results being busy reaches an eighth number after a fourth timer expires; wherein, the fourth timer is started when a monitoring result of an LBT instance is busy.

5. The apparatus according to supplement 4, wherein the BWP includes multiple channels, and the LBT monitoring failure on the BWP refers to that LBT monitoring on at least one channel of the BWP fails.

6. The apparatus according to supplement 1, wherein that the processing unit triggering a radio link failure on the MAC layer of the terminal equipment according to the indication includes:

on the MAC layer, when the indication is received, deeming that random access fails; or on the MAC layer, when a second condition is satisfied according to the indication, deeming that random access fails, the second condition being at least one of the following:

for multiple LBT monitoring in a period of time, the number of instances with LBT monitoring results being busy reaches a first number;

for multiple LBT monitoring, a proportion with LBT monitoring results being busy reaches a first proportion;

the number of instances with LBT monitoring results being busy reaches a second number, and the number of instances with LBT monitoring results being idle does not reach a third number within timing of a first timer; wherein, the first timer is started when the number of instances with LBT monitoring results being busy reaches the second number; and the number of instances with LBT monitoring results being busy reaches a fourth number after a second timer expires; wherein, the second timer is started when a monitoring result of an LBT instance is busy.

7. The apparatus according to supplement 1, wherein that the processing unit triggering RRC connection reestablishment on the RRC layer of the terminal equipment according to the indication includes:

on the RRC layer, when the indication is received, initiating a connection reestablishment procedure; or on the RRC layer, when a third condition is satisfied according to the indication, initiating a connection reestablishment procedure, the third condition being at least one of the following:

for multiple LBT monitoring in a period of time, the number of instances with LBT monitoring results being busy reaches a first number;

for multiple LBT monitoring, a proportion with LBT monitoring results being busy reaches a first proportion;

the number of instances with LBT monitoring results being busy reaches a second number, and the number of instances with LBT monitoring results being idle does not reach a third number within timing of a first timer; wherein, the first timer is started when the number of instances with LBT monitoring results being busy reaches the second number; and the number of instances with LBT monitoring results being busy reaches a fourth number after a second timer expires; wherein, the second timer is started when a monitoring result of an LBT instance is busy.

8. The apparatus according to supplement 1, wherein that the processing unit triggering a radio link failure on the RRC layer of the terminal equipment according to the indication includes:

on the RRC layer, when the indication is received, deeming that the radio link fails; or on the RRC layer, when a fourth condition is satisfied according to the indication, deeming that the radio link fails, the fourth condition being at least one of the following:

for multiple LBT monitoring in a period of time, the number of instances with LBT monitoring results being busy reaches a first number;

for multiple LBT monitoring, a proportion with LBT monitoring results being busy reaches a first proportion;

the number of instances with LBT monitoring results being busy reaches a second number, and the number of instances with LBT monitoring results being idle does not reach a third number within timing of a first timer; wherein, the first timer is started when the number of instances with LBT monitoring results being busy reaches the second number; and the number of instances with LBT monitoring results being busy reaches a fourth number after a second timer expires; wherein, the second timer is started when a monitoring result of an LBT instance is busy.

9. The apparatus according to supplement 1, wherein that the processing unit performing counter maintenance on the MAC layer of the terminal equipment according to the indication includes:

on the MAC layer of the terminal equipment, the processing unit performs counter maintenance according to any one of the following mechanism:

for each transmission opportunity of msg.3 on which LBT monitoring is performed, if the LBT monitoring of the transmission opportunity of msg.3 fails, incrementing a random access preamble transmission counter by 1;

for each transmission opportunity of msg.3 on which LBT monitoring is performed, if the LBT monitoring of the transmission opportunity of msg.3 fails and a contention resolution timer expires, incrementing a random access preamble transmission counter by 1; and in case of LBT monitoring failure, incrementing a first counter by 1 until the value of the first counter reaches a maximum value.

10. An apparatus for transmitting msg.3, configured in a terminal equipment, the apparatus including:

a first determining unit configured to, on a media access control (MAC) layer of the terminal equipment, determine a first number of transmission opportunities used for transmitting msg.3; and a second determining unit configured to, on a physical layer of the terminal equipment, determine a second number of transmission opportunities used for transmitting msg.3 according to the first number of transmission opportunities, both the first number and the second number being greater than 1.

11. The apparatus according to supplement 10, wherein the apparatus further includes:

a receiving unit configured to receive configuration information transmitted by a network device, and obtain at least one transmission opportunity configured by the network device for the msg.3 according to the configuration information.

12. The apparatus according to supplement 10, wherein the apparatus further includes:

a third determining unit configured to, on the physical layer of the terminal equipment, determine a transmission opportunity used for performing listen before talk (LBT) monitoring, which includes at least one of the following:

performing LBT monitoring on all the second number of transmission opportunities;

selecting a part of the second number of transmission opportunities and performing LBT monitoring thereon; and performing LBT monitoring on the second number of transmission opportunities in a chronological order, until a first condition is satisfied, the first condition being that a fourth number of pieces of LBT monitoring succeed or LBT monitoring is performed on all the second number of transmission opportunities.

13. The apparatus according to supplement 10, wherein the apparatus includes:

a starting unit configured to start a contention resolution timer according to the first number of transmission opportunities or the second number of transmission opportunities.

14. The apparatus according to supplement 13, wherein the number of the contention resolution timer is 1, and a transmission opportunity starting the contention resolution timer is any one of the following:

if the physical layer of the terminal equipment performs transmission of msg.3 on one transmission opportunity only, the transmission opportunity starting the contention resolution timer is the transmission opportunity transmitting the msg.3;

if the physical layer of the terminal equipment performs transmission of msg.3 on multiple transmission opportunities, the transmission opportunity starting the contention resolution timer is a first transmission opportunity or a last transmission opportunity in the multiple transmission opportunities;

if LBT monitoring of only one transmission opportunity succeeds, the transmission opportunity starting the contention resolution timer is the transmission opportunity succeeding in LBT monitoring;

if LBT monitoring of multiple transmission opportunities succeeds, the transmission opportunity starting the contention resolution timer is a first transmission opportunity or a last transmission opportunity in the transmission opportunities succeeding in LBT monitoring;

if LBT monitoring of only one transmission opportunity is performed, the transmission opportunity starting the contention resolution timer is the transmission opportunity on which the LBT monitoring is performed;

if LBT monitoring of multiple transmission opportunities is performed, the transmission opportunity starting the contention resolution timer is a first transmission opportunity or a last transmission opportunity in the transmission opportunities on which the LBT monitoring is performed;

if the MAC layer of the terminal equipment determines one transmission opportunity, the transmission opportunity starting the contention resolution timer is the transmission opportunity determined by the MAC layer of the terminal equipment; and if the MAC layer of the terminal equipment determines multiple transmission opportunities, the transmission opportunity starting the contention resolution timer is a first transmission opportunity or a last transmission opportunity in the transmission opportunities determined by the MAC layer of the terminal equipment.

15. The apparatus according to supplement 13, wherein the number of the contention resolution timer is plural, and a transmission opportunity starting the contention resolution timer is any one of the following:

if the physical layer of the terminal equipment performs transmission of msg.3 on multiple transmission opportunities, the terminal equipment starts one RAR reception window on each transmission opportunity or each group of transmission opportunities transmitting the msg.3, and in a case of starting one contention resolution timer on each group of transmission opportunities, the transmission opportunity starting the RAR the reception window is a first transmission opportunity or a last transmission opportunity in the multiple transmission opportunities transmitting the msg.3;

if LBT monitoring of multiple transmission opportunities succeeds, the terminal equipment starts one RAR reception window on each transmission opportunity or each group of transmission opportunities succeeding in LBT monitoring, and in an case of starting one contention resolution timer on each group of transmission opportunities, the transmission opportunity starting the RAR reception window is a first transmission opportunity or a last transmission opportunity in the multiple transmission opportunities succeeding in LBT monitoring;

if LBT monitoring of multiple transmission opportunities are performed, the terminal equipment starts one RAR reception window on each transmission opportunity or each group of transmission opportunities on which the LBT monitoring is performed, and in a case of starting one contention resolution timer on each group of transmission opportunities, the transmission opportunity starting the RAR reception window is a first transmission opportunity or a last transmission opportunity in the multiple transmission opportunities on which the LBT monitoring is performed; and if the MAC layer of the terminal equipment determines multiple transmission opportunities, the terminal equipment starts an RAR reception window on each transmission opportunity or each group of transmission opportunities determined by the MAC layer of the terminal equipment, and the transmission opportunity starting the RAR reception window is a first transmission opportunity or a last transmission opportunity in the multiple transmission opportunities determined by the MAC layer of the terminal equipment.

16. The apparatus according to supplement 15, wherein one group of ROs are transmission opportunities to which one SSB or one CSI-RS corresponds, or one group of ROs are transmission opportunities on one channel or one BWP, or transmission opportunities on one cell.

17. A configuration apparatus, configured in a network device, the apparatus including:
a configuring unit configured to configure multiple initial BWPs for a terminal equipment in an idle state or an active state, one transmission opportunity for transmitting msg.3 on each of the initial BWPs being determined by the terminal equipment.

18. The apparatus according to supplement 17, wherein the apparatus further includes:
a first receiving unit, configured to receive first indication information transmitted by the terminal equipment; and
a first processing unit, configured to determine that an active BWP is a BWP on which the first indication information is transmitted according to the first indication information.

What is claimed is:

1. An apparatus for processing LBT monitoring failures, configured in a terminal equipment, the apparatus comprising:
a memory storing a plurality of instructions; and
processor circuitry coupled to the memory and configured to execute the plurality of instructions to:
perform LBT monitoring on a physical layer of the terminal equipment, and indicate an LBT monitoring failure or random access preamble transmission drop or an LBT detection instance failure to an MAC layer or an RRC layer when it deems that the LBT monitoring fails; and
perform random access resource selection on the MAC layer or the RRC layer of the terminal equipment according to the indication.

2. The apparatus according to claim 1, wherein when for transmission opportunity(ies) of a preamble indicated by the MAC layer of the terminal equipment, one or more LBT monitoring results is/are busy, the processor circuitry is further configured to deem that the LBT monitoring fails at the physical layer of the terminal equipment.

3. The apparatus according to claim 2, wherein processor circuitry is further configured to:
on the physical layer of the terminal equipment, provide information on a channel or a BWP on which an LBT monitoring fails, to the MAC layer; and/or, on the physical layer of the terminal equipment, provide an index of an SSB of which an LBT monitoring fails and/or a resource identifier of a CSI-RS of which an LBT monitoring fails, to the MAC layer.

4. An apparatus for processing LBT monitoring failures, configured in a terminal equipment, the apparatus comprising:
a memory storing a plurality of instructions; and
processor circuitry coupled to the memory and configured to execute the plurality of instructions to:
perform LBT monitoring on a physical layer of the terminal equipment, and indicate an LBT monitoring failure or random access preamble transmission drop or an LBT detection instance failure to an MAC layer or an RRC layer when it deems that the LBT monitoring fails; and
perform counter maintenance on the MAC layer of the terminal equipment according to the indication,
wherein performing the counter maintenance on the MAC layer of the terminal equipment according to the indication comprises:
performing the counter maintenance on the MAC layer of the terminal equipment according to one of the following mechanism;
for each RO on which LBT monitoring is performed, if the LBT monitoring of the RO fails, incrementing a preamble transmission counter by 1;
for each RO on which LBT monitoring is performed if the LBT monitoring of the RO fails and an RAR reception window expires, incrementing a preamble transmission counter by 1; and
in case of LBT monitoring failure, incrementing a first counter by 1 until the value of the first counter reaches a maximum value.

5. The apparatus according to claim 4, wherein when for transmission opportunities of a preamble indicated by the MAC layer of the terminal equipment, one LBT monitoring results is busy, the processor circuitry is further configured to deem that the LBT monitoring fails at the physical layer of the terminal equipment.

6. The apparatus according to claim 5, wherein the processor circuitry is further configured to:
on the physical layer of the terminal equipment, provide information on a channel or a BWP of which an LBT monitoring fails, to the MAC layer; and/or, on the physical layer of the terminal equipment, provide an index of an SSB of which an LBT monitoring fails and/or a resource identifier of a CSI-RS of which an LBT monitoring fails, to the MAC layer.

7. An apparatus for processing LBT monitoring failures, configured in a terminal equipment, the apparatus comprising:
a memory storing a plurality of instructions; and
processor circuitry coupled to the memory and configured to execute the plurality of instructions to:
perform LBT monitoring on a physical layer of the terminal equipment, and indicate an LBT monitoring failure or random access preamble transmission drop or an LBT detection instance failure to an MAC layer or an RRC layer when it deems that the LBT monitoring fails; and
trigger BWP switching or to trigger a radio link failure on the MAC layer or the RRC layer of the terminal equipment according to the indication.

8. The apparatus according to claim 7, wherein when one LBT monitoring result is busy, the processor circuitry is further configured to deem that the LBT monitoring fails at the physical layer of the terminal equipment.

9. The apparatus according to claim 8, wherein the processor circuitry is further configured to:
on the physical layer of the terminal equipment, provide information on a channel or a BWP on which an LBT monitoring fails, to the MAC layer; and/or, on the physical layer of the terminal equipment, provide an index of an SSB of which an LBT monitoring fails and/or a resource identifier of a CSI-RS of which an LBT monitoring fails, to the MAC layer.

10. The apparatus according to claim 7, wherein when on one BWP, for multiple LBT monitoring in a period of time, the number of instances with LBT monitoring results being busy reaches a fifth number, the processor circuitry is further configured to trigger BWP switching on the MAC layer of the terminal equipment according to the indication.

11. The apparatus according to claim 10, wherein the BWP comprises multiple channels, and the LBT monitoring failure on the BWP refers to that LBT monitoring on at least one channel of the BWP fails.

12. The apparatus according to claim 7, wherein triggering the radio link failure on the RRC layer of the terminal equipment according to the indication comprises:

- on the RRC layer, when the indication is received, deeming that the radio link fails; or
- on the RRC layer, when a fourth condition is satisfied according to the indication, deeming that the radio link fails, the fourth condition being at least one of the following:
- for multiple LBT monitoring in a period of time, the number of instances with LBT monitoring results being busy reaches a first number;
- for multiple LBT monitoring, a proportion with LBT monitoring results being busy reaches a first proportion;
- the number of instances with LBT monitoring results being busy reaches a second number, and the number of instances with LBT monitoring results being idle does not reach a third number within timing of a first timer; wherein, the first timer is started when the number of instances with LBT monitoring results being busy reaches the second number; and
- the number of instances with LBT monitoring results being busy reaches a fourth number after a second timer expires; wherein, the second timer is started when a monitoring result of an LBT instance is busy.

* * * * *